(12) United States Patent
Curran et al.

(10) Patent No.: US 10,663,601 B2
(45) Date of Patent: May 26, 2020

(54) METHOD AND APPARATUS FOR PROCESSING RADIONAVIGATION SIGNALS FOR ATMOSPHERIC MONITORING

(71) Applicant: The European Union, represented by the European Commission, Brussels (BE)

(72) Inventors: James T Curran, Ispra (IT); Michele Bavaro, Sesto Calende (IT); Joaquim Fortuny-Guasch, Taino (IT)

(73) Assignee: THE EUROPEAN UNION, Brussels (BE)

( * ) Notice: Subject to any disclaimer, the term of this patent is extended or adjusted under 35 U.S.C. 154(b) by 544 days.

(21) Appl. No.: 15/300,028

(22) PCT Filed: Mar. 27, 2015

(86) PCT No.: PCT/EP2015/056795
§ 371 (c)(1),
(2) Date: Sep. 28, 2016

(87) PCT Pub. No.: WO2015/144914
PCT Pub. Date: Oct. 1, 2015

(65) Prior Publication Data
US 2017/0139050 A1    May 18, 2017

(30) Foreign Application Priority Data
Mar. 28, 2014 (EP) ..................... 14162381

(51) Int. Cl.
*G01S 19/40* (2010.01)
*G01S 19/07* (2010.01)
(Continued)

(52) U.S. Cl.
CPC ............... *G01S 19/40* (2013.01); *G01S 1/00* (2013.01); *G01S 19/072* (2019.08); *G01S 19/24* (2013.01); *G01S 19/243* (2013.01)

(58) Field of Classification Search
CPC ........ G01S 19/07; G01S 19/072; G01S 19/26; G01S 19/37; G01S 19/40; G01S 19/243
See application file for complete search history.

(56) References Cited

U.S. PATENT DOCUMENTS

| | | | |
|---|---|---|---|
| 4,894,662 A * | 1/1990 | Counselman | G01C 15/00 342/357.25 |
| 5,629,708 A | 5/1997 | Rodal et al. | |

(Continued)

FOREIGN PATENT DOCUMENTS

| | | |
|---|---|---|
| CN | 101424734 A | 5/2009 |
| EP | 0242115 A2 | 4/1987 |

OTHER PUBLICATIONS

Kintner et al. "GPS and Ionospheric Scintillations." Space Weather, vol. 5. American Geophysical Union. 2007. Pages 1-23.*
(Continued)

*Primary Examiner* — Gregory C. Issing
(74) *Attorney, Agent, or Firm* — Cantor Colburn LLP

(57) ABSTRACT

The invention provides an atmospheric monitoring and measurement system based on the processing of global navigation satellite system radio-frequency signals. The invention is characterized by an open-loop demodulation architecture to extract amplitude and phase information from the received satellite signals, and a signal processing technique which can provide statistics relating to the amplitude and phase variations induced by the atmosphere.

29 Claims, 5 Drawing Sheets

(51) Int. Cl.
*G01S 19/24* (2010.01)
*G01S 1/00* (2006.01)

(56) References Cited

U.S. PATENT DOCUMENTS

| | | | | |
|---|---|---|---|---|
| 6,633,255 | B2* | 10/2003 | Krasner | G01S 5/0027 |
| | | | | 342/357.63 |
| 7,912,422 | B2* | 3/2011 | Rocken | G01S 19/14 |
| | | | | 455/12.1 |
| 9,910,158 | B2* | 3/2018 | Rudow | G01S 19/04 |
| 2003/0225514 | A1 | 12/2003 | Lokshin et al. | |
| 2013/0099970 | A1* | 4/2013 | Lin | G01S 19/40 |
| | | | | 342/357.68 |

OTHER PUBLICATIONS

R. Romero, N. Linty, F. Dovis and R. V. Field, "A novel approach to ionospheric scintillation detection based on an open loop architecture," 2016 8th ESA Workshop on Satellite Navigation Technologies and European Workshop on GNSS Signals and Signal Processing (NAVITEC), Noordwijk, 2016, pp. 1-9. (Year: 2016).*

F Niu et al. "GPS Carrier Phase Detranding Methods and Performances for Ionosphere Scintillation Studies", ITM 2012—Proceedings of the 2012 International Technical Meeting of the Institute of Navigation; Feb. 1, 2012; pp. 1462-1467; XP056000934.

G. Beyerle et al. "Observations and simulations of receiver-induced refractivity biases in GPS radio occultation"; Journal of Geophysical Research; Jan. 1, 2006; vol. 111, No. D12; XP055158431.

International Preliminary Report on Patentability dated Jun. 13, 2016 re: Application No. PCT/EP2015/056795; pp. 1-22; J. York et al., T D Lulich et al., K-N Wang et al., G. Beyerle et al., US 4 894 662 A, F Niu et al.

International Search Report dated Jul. 1, 2015 re: Application No. PCT/EP2015/056795; pp. 1-7; citing: J. York et al., T D Lulich et al., K-N Wang et al., F Niu et al., US 2003/225514 A1, US 5 629 708 A, G Beyerle et al. and US 4 894 662 A.

J. York et al. "Development of a Prototype Texas Ionospheric Ground Receiver (TIGR)", ITM 2012 Proceedings of the 2012 International Technical Meeting of the Institute of Navigation; Feb. 1, 2012; pp. 1526-1556; XP056000936.

K-N Wang et al. "Open-loop tracking of rising and setting GNSS radio-occultation signals form an Airborne Platform: Signal modeland statistical analysis", 2013 IEEE Inernational Geoscience and Remote Sensing Symposium; Jul. 21, 2013; pp. 367-3370; XP032558256.

T D Lulich et al. "Open Loop Tracking of Radio Occultation Signals from an Airborne Platform" GNSS 2010—Porceedings of the 23rd International Technical Meeting of the Satellite Division of the Institute of Navigation (ION GNSS 2010); Sep. 24, 2010; pp. 1049-1060; XP056000217.

Written Opinion Report dated Jul. 1, 2015 re: Application No. PCT/EP2015/056795; pp. 1-7; citing: J. York et al., T D Lulich et al., K-N Wang et al., F Niu et al., US 2003/225514 A1, US 5 629 708 A, G Beyerle et al. and US 4 894 662 A.

* cited by examiner

METHOD AND APPARATUS FOR PROCESSING RADIONAVIGATION SIGNALS FOR ATMOSPHERIC MONITORING

TECHNICAL FIELD

The present invention relates to the measurement of the atmosphere using ground-based global navigation satellite system receivers and in particular to the measurement of statistics pertaining to the ionosphere and ionospheric activity.

BACKGROUND

Space-based radio signals are used extensively for atmospheric monitoring. As these signals propagate from their space-based transmitters to the earth, the atmosphere induces phase shifts, group delays, and amplitude variations. A receiver which processes these signals in an appropriate fashion can extract an estimate of these phase, delay and amplitude variations and can, in turn, infer some information about the atmosphere. Global Navigation Satellite System (GNSS) signals are widely used for this purpose, due both to their abundance, their global coverage, and the fact that they are transmitted at more than one frequency. The ionosphere and troposphere are monitored using these signals as they both induce propagation speed and direction changes to signals transmitted in the L-band.

To measure these effects, GNSS receivers are employed. These receivers track the carrier frequency and phase and the modulated ranging-code of these signals and produce measurements of the signal power, the carrier phase and the ranging-code delay. These values, hereafter referred to as raw signal measurements, are then used to calculate various properties relating to the signal propagation through the atmosphere, hereafter referred to as atmosphere-measurements. Conventionally, to produce these raw signal measurements the receiver performs a closed-loop tracking of the parameters of interest, and typical systems include the use of a Delay-Lock Loop (DLL) for the ranging-code and a Phase-Lock Loop (PLL) for the carrier. Although many other systems are available, in general, receivers rely on some sort of recursive feed-back/feed-forward mechanism to produce the raw signal measurements.

The calculation of atmosphere-measurements is dependent upon both the availability and the quality of the raw signal measurements. Thus, when the receiver tracking algorithms experience difficulty in accurately tracking the signal parameters, the quality of the resultant atmosphere-measurements is reduced. The particular implementation of the tracking algorithm also has an impact on the resultant atmosphere-measurements; for example, filtering effects or transient errors within the tracking algorithms can produce artefacts in the atmosphere-measurements.

Atmospheric anomalies (for example, ionospheric scintillation) can cause difficulties for a receiver's tracking algorithm, and when a receiver is used to measure this anomaly the atmosphere-measurements can be significantly degraded in quality, due to either degraded quality of the raw signal measurements or due to their unavailability, when the tracking algorithms fail. Many techniques used to improve receiver tracking robustness and measurement availability, such as extended integration times and reduced tracking bandwidths, also contribute to a degradation of the raw signal measurements and, ultimately, result in artefacts in the atmosphere-measurements.

The generation of certain atmosphere-measurements including, for example, the ionospheric measurement known as sigma-phi ($\sigma_\varphi$), necessitates a filtering of the raw signal measurements. This filtering stage, often known as a de-trending, has a significantly long convergence time. When intermittent unavailability of raw signal measurements occurs, the resultant unavailability of the atmospheric-measurements can be far longer.

A weakness in the contemporary approaches is the estimation stage. Raw signal parameters are estimated or tracked by the receiver prior to being used to compute the atmosphere-measurements. This tracking stage is problematic when non-ideal conditions prevail. The drawbacks of conventional systems will be discussed in relation to FIGS. 1 and 2 (PRIOR ART), while addressing some theoretical factors.

Typically the GNSS signal received at the antenna of a ground-based receiver is modelled as:

$$r(t) = \sum_{i \in S_{sig}} s^i(t) + n(t) \tag{1}$$

$$s^i(t) = \sqrt{2P_i(t)}\, d_i(t - \tau_i(t)) c_i(t - \tau_i(t)) \sin(\omega_i t + \theta_i(t)),$$

where $S_{sig}$ is the set of satellite signals in view, $s^i(t)$ denotes the $i^{th}$ signal received from the visible satellites and $n(t)$ denotes the additive thermal noise. The various parameters in Eq. (1) represent the following signal properties: $P_i$ is the total received signal power in watts; $\omega_i$ is the nominal RF carrier frequency in units of rad/s; $d_i(t)$ represents the bi-podal data signal or secondary code; $c_i(t)$ is the signal spreading sequence and sub-carrier; $\theta_i(t)$ is the total received phase process including propagation delays, satellite-to-user dynamics, atmospheric effects and satellite clock effects; the process $\tau_i(t)$ represents the total delay observed at the receiver, including propagation delay, satellite clock effects and atmospheric delays.

In particular, the carrier phase term, $\theta_i(t)$ in Eq. (1) represents a number of distinct phase processes. Mathematically, it can be represented as the linear combination:

$$\theta_i(t) = \theta_0 + \theta_{LOS}(t) + \theta_{SV\,Clk}(t) + \theta_{Atm}(t) \tag{2}$$

where $\theta_0$ represents some arbitrary initial phase, $\theta_{LOS}(t)$ represents the phase process induced by the line-of-sight geometry/dynamics between the satellite and the receiver, $\theta_{SV\,Clk}(t)$ represents the phase process induced by errors in the satellite clock, and $\theta_{Atm}(t)$ represents the phase process induced by the atmosphere through which the signal propagates.

FIG. 1 (PRIOR ART) is a block diagram of the Digital Matched Filter 102-1 of a conventional receiver, illustrating how the local estimates of carrier phase ($\hat{\theta}_i$) and ranging-code delay ($\hat{\tau}_i$) are used to generate the correlator values $Y_i[n]$.

A GNSS receiver will, generally, implement a down-conversion of the received RF signal to a zero or non-zero IF and subsequently sample the signal. These signal samples (r) are then processed by a Digital Matched Filter (DMF) 102-1 which implements the following operation:

$$Y_i[n] = \frac{1}{T_I} \sum_{m=n\frac{T_I}{T_S}}^{(n+1)\frac{T_I}{T_S}-1} r(mT_S) c_i(\hat{\tau}_i(mT_S)) e^{-j(\omega_i(mT_S) + \hat{\theta}_i(mT_S))}, \tag{3}$$

where the variables $\hat{\tau}_i$ and $\hat{\theta}_i$ are the receiver's estimate of the variables $\tau_i$ and $\theta_i$, as defined in Eq. (1), and the term $Y_i[n]$ is known as the correlator value.

The operation described by Eq. (3) is implemented in the receiver in its tracking algorithm as part of the carrier phase and ranging-code phase tracking loops.

FIG. 2 (PRIOR ART) is a block diagram of a typical closed-loop tracking architecture depicting a loop for both a carrier tracking loop 104 and a ranging-code tracking 106. As will be appreciated by persons skilled in the art, a DMF bank 102 incorporates a plurality of instances 102-1, 102-2, 102-3 (i.e. one per channel; here, only three are shown).

A typical implementation follows the block diagram presented in FIG. 2, whereby the correlator values, $Y_i[n]$, are processed by the carrier tracking block 104 and ranging-code tracking block 106 to produce estimates of the signal parameters, $\hat{\tau}_i$ $(mT_s)$ and $\hat{\theta}_i$ $(mT_s)$, which, in turn, are used to generate the subsequent set of correlator values $Y_i[n]$.

The particular algorithms which are used to estimate properties and attributes of the atmosphere through which the GNSS signals have propagated are implemented in the block entitled 'Atmospheric Monitoring Algorithms' 108. These algorithms operate on the following quantities: $Y_i[n]$, as generated by the DMF 102 and $\hat{\tau}_i$ and $\hat{\theta}_i$ which are estimated by the tracking algorithms. The performance of the monitoring algorithms is directly influenced by the quality of the raw signal measurements and so correct operation of both the carrier and ranging-code tracking algorithms is crucial to atmospheric monitoring receivers. A problem is that under high atmospheric activity conditions variations in the propagation channel can be such that these tracking algorithms can perform poorly or fail.

YORK J ET AL: "Development of a Prototype Texas Ionospheric Ground Receiver (TIGR)", ITM 2012—PROCEEDINGS OF THE 2012 INTERNATIONAL TECHNICAL MEETING OF THE INSTITUTE OF NAVIGATION, THE INSTITUTE OF NAVIGATION, 8551 RIXLEW LANE SUITE 360 MANASSAS, Va. 20109, USA, 1 Feb. 2012 (2012-02-01), pages 1526-1556, XP056000936, discloses a software receiver designed to make ionospheric measurements from satellite signals. RF data is directly sampled via a 2 Gigasample/s ADC and passed to an FPGA, where it is digitally filtered, and down-sampled into three tunable bands, each with a bandwidth of 20 MHz. A reduced digital data stream is passed to a second FPGA, where the individual channels are filtered into multiple narrow signal bands, centered on the frequency of the satellite signal as adjusted to compensate for the predicted Doppler shift. Estimation of the phase and amplitude of the signal in this data is accomplished by the use of onboard software running on a general purpose CPU.

LULICH T D ET AL: "Open Loop Tracking of Radio Occultation Signals from an Airborne Platform", GNSS 2010—PROCEEDINGS OF THE 23RD INTERNATIONAL TECHNICAL MEETING OF THE SATELLITE DIVISION OF THE INSTITUTE OF NAVIGATION (ION GNSS 2010), THE INSTITUTE OF NAVIGATION, 8551 RIXLEW LANE SUITE 360 MANASSAS, Va. 20109, USA, 24 Sep. 2010 (2010-09-24), pages 1049-1060, XP056000217, discloses a radio occultation (RO) based remote sensing technique that uses signals from the Global Positioning System (GPS) to determine electron density in the ionosphere, using an open loop (OL) tracking method employing a model-based estimate of Doppler frequency and a record of the GPS data bits.

G. BEYERLE ET AL: "Observations and simulations of receiver-induced refractivity biases in GPS radio occultation", JOURNAL OF GEOPHYSICAL RESEARCH, vol. 111, no. D12, 1 Jan. 2006 (2006-01-01), XP055158431, ISSN: 0148-0227, DOI: 10.1029/2005J D006673 discloses observations and simulations of receiver-induced refractivity biases in GPS radio occultation.

NIU F ET AL: "GPS Carrier Phase Detrending Methods and Performances for Ionosphere Scintillation Studies", ITM 2012—PROCEEDINGS OF THE 2012 INTERNATIONAL TECHNICAL MEETING OF THE INSTITUTE OF NAVIGATION, THE INSTITUTE OF NAVIGATION, 8551 RIXLEW LANE SUITE 360 MANASSAS, Va. 20109, USA, 1 Feb. 2012 (2012-02-01), pages 1462-1467, XP056000934, discloses GPS carrier phase detrending methods and performances for ionosphere scintillation studies. The detrending makes use of a $6^{th}$ order Butterworth filter.

The present invention further seeks to produce atmospheric measurements derived from raw signal measurements of radionavigation (e.g. GNSS) signals which are generated in a purely open-loop manner.

The present invention seeks to generate atmospheric measurements even in circumstances of poor quality raw signal measurements and/or high atmospheric activity.

SUMMARY OF THE INVENTION

According to one aspect of the invention there is provided a measurement system for generating atmospheric measurements based on at least one radionavigation signal from a satellite-borne transmitter of a radionavigation system, the measurement system comprising: a data acquisition module, a demodulator module and an atmospheric monitoring algorithms module arranged in an open loop configuration; wherein the data acquisition module includes a reference clock, the data acquisition module being adapted to receive said radionavigation signal and generate therefrom a plurality of IF samples (r), each sample having an associated time tag (TOW) derived from said reference clock; wherein the demodulator module is adapted to receive said IF samples (r) and associated time tags (TOW) and auxiliary data related to said satellite system, and is adapted to generate correlator values $(Y_i)$ therefrom; and wherein the atmospheric monitoring algorithm module is adapted to receive said correlator values $(Y_i)$ and to generate therefrom said atmospheric measurements.

The data acquisition module may be adapted to output each IF sample (r) as a tagged IF sample (r), each tagged IF sample (r) comprising an IF sample (r) tagged with a respective time tag (TOW).

The demodulator module may be adapted to receive said tagged IF samples (r), whereby each correlator value $(Y_i)$ generated by the demodulator module (32) is associated with a respective time tag (TOW).

The data acquisition module may comprise an analog-to-digital converter (ADC) for generating the IF samples (r), the ADC being coupled to the reference clock (418) and generating the IF samples (r) under the timing thereof.

The data acquisition module may comprise a time tagging module adapted to output said time tags (TOW) synchronously with a respective IF samples (r).

The data acquisition module may comprise a time tagging module coupled to the reference clock, time tagging module being adapted to operate as a local counter representing local time, the count of the local counter being incremented as each IF sample (r) is generated.

The data acquisition module may comprise a down-converter adapted to generate analog IF signals from the radionavigation signals, the down-converter operating based on a conversion signal derived from the output of the reference clock.

The data acquisition module may comprise a PLL coupled to receive the output of the reference clock, wherein the PLL drives a VCO that provides the conversion signal to the down-converter.

The reference clock may have a degree of alignment with a time-frame of the radionavigation signal of less than one tenth of the period of a ranging-code chip of the radionavigation signal.

The reference clock may have a degree of alignment with a time-frame of the radionavigation signal such that it can be used to propagate an estimate of time, for the generation of time-tags, with an accuracy of about 1 nanosecond.

The reference clock may be adapted to propagate from an initial synchronization point, corresponding to an initial time-tag, forward in time.

In one embodiment, the reference clock comprises a perfectly modelled clock, wherein said time tags are derived from time signals propagated from a signal synchronization point in the past using a predetermined sample period.

In another embodiment, the reference clock comprises a disciplined oscillator, the disciplined oscillator including an internal oscillator and being adapted to receive a disciplining clock signal from an external frequency standard. The system may be operable in an initiation phase and a data acquisition phase, wherein the reference clock is operable such that disciplining by the disciplined oscillator is active during the initiation phase and disabled during the data acquisition phase. The external frequency standard may be provided by one of a GNSS signal and a GPS Disciplined Oscillator (GPSDO) signal.

In another embodiment, the reference clock comprises a free running clock upon which live modelling of its unknown parameters are performed using a clock estimation algorithm. The reference clock may be operable to measure estimated clock parameters, and accurately propagate the time-tags from an initial synchronization point based on the estimated clock parameters. The estimated clock parameters may be measured from radionavigation signals from a first set of satellite-borne transmitters and wherein the radionavigation signal(s) received by said data acquisition module are from one or more satellite-borne transmitters of a second set of satellite-borne transmitters, the first set and the second set not having a satellite-borne transmitter in common.

The auxiliary data may include a receiver related parameter (Rec.), the receiver related parameter representing a piecewise continuous trajectory of the receiver antenna in an earth centered, earth fixed frame.

The auxiliary data may include orbital parameters (S.V.) of a satellite upon which the transmitter is mounted. The orbital parameters (S.V.) may comprise broadcast ephemerides. The broadcast ephemerides may comprise GNSS ephemerides or precise ephemerides.

The auxiliary data may include ephemeris information (ATM).

The demodulator module may include a user receiver model for receiving a time tag (TOW) and the receiver related parameter (Rec.), and for outputting a receiver related time delay ($\delta t_{RX}$).

The demodulator module may include a space vehicle model (506), the space vehicle model being adapted to receive a time tag (TOW) and the orbital parameters (S.V.), and to generate a space vehicle related time delay ($\delta t_{SV}$).

The demodulator module may include an atmospheric model, the atmospheric model being adapted to receive the time tag (TOW), the receiver related time delay ($\delta t_{RX}$), the space vehicle related time delay ($\delta t_{SV}$) and the ephemeris information (Atm.), and to output an atmosphere related time differential ($\delta t_A$).

The demodulator module is adapted to generate a first sum comprising the sum of the receiver related time differential ($\delta t_{RX}$) and the space vehicle related time differential ($\delta t_{SV}$), and to generate a second sum comprising the sum of the first sum and the atmosphere related time differential ($\delta t_A$) in order to generate a signal related time delay ($t_{SIG}$).

The demodulator module may further includes a code and carrier MCO, adapted to receive the signal delay ($t_{SIG}$) and to generate an estimate ($\hat{S}_i$) for input to a DMF.

The atmospheric monitoring algorithms module may include a phase process reconstruction algorithm, the phase process reconstruction algorithm comprising:
- de-rotating the current correlator values ($Y_i$) by the previous phase estimate;
- estimating the residual phase ($\varphi$) using a discriminator; and
- computing the current phase ($\theta$) as the sum of the previous phase and the current residual phase ($\varphi$).

The atmospheric monitoring algorithm module may include a phase-difference process algorithm, the phase-difference process algorithm being operable to reconstruct the phase difference using $$\Delta[n] = \begin{cases} \text{atan2(Cross, Dot)} & \text{if data known} \\ \text{atan}\left(\dfrac{\text{Cross}}{\text{Dot}}\right) & \text{otherwise} \end{cases}$$

$$\text{Dot} = \Re\{Y[n]\}\Re\{Y[n-1]\} + \Im\{Y[n]\}\Im\{Y[n-1]\}$$

$$\text{Cross} = \Im\{Y[n]\}\Re\{Y[n-1]\} - \Re\{Y[n]\}\Im\{Y[n-1]\}$$

In an embodiment, wherein $\sigma_\varphi$ may be computed from $\Delta[n]$ values using a filter given by $$H(z) = \frac{C(z)}{A(z)} = \frac{\sum_{i=0}^{5} c_i z^{-i}}{1 + \sum_{i=1}^{6} a_i z^{-i}}.$$

to generate values for $\phi$.

In an embodiment, $\sigma_\varphi$ is obtained from $\sigma_\varphi^2$ using the function $\langle \varphi^2 \rangle \hat{T} - \langle \varphi \rangle \hat{T}^2$.

According to another aspect of the invention there is provided a measurement method for generating atmospheric measurements based on at least one radionavigation signal from a satellite-borne transmitter of a radionavigation system, the method comprising: providing a data acquisition module, a demodulator module and an atmospheric monitoring algorithms module arranged in an open loop configuration, wherein the data acquisition module includes a reference clock; receiving, using the data acquisition module, said radionavigation signal and generating therefrom a plurality of IF samples (r), each sample having an associated time tag (TOW) derived from said reference clock; receiving, using the demodulator module, said IF samples (r) and associated time tags (TOW) and auxiliary data related to said satellite system, and generating correlator values ($Y_i$) therefrom; and receiving, using the atmospheric monitoring algorithm module, said correlator values ($Y_i$) and generating therefrom said atmospheric measurements.

According to another aspect of the invention there is provided a recordable, rewritable or storable medium having recorded or stored thereon data defining or transformable into instructions for execution by processing circuitry.

According to another aspect of the invention there is provided a server computer incorporating a communications device and a memory device and being adapted for transmission on demand or otherwise of data defining or transformable into instructions for execution by processing circuitry.

An advantage is that, by appropriate use of some assistance information relating to the receiver time and position, and modifying the method of calculating the atmospheric-measurements, the tracking stage can be entirely circumvented, thus producing a more robust monitoring system.

A further advantage is that, by operating in an open-loop mode and by circumventing the need for a continuous and full phase estimate, embodiments of the invention provide resilience to weak-signal environments, robust tracking under very sever ionospheric activity, and higher availability of measurements than traditional receiver architectures.

BRIEF DESCRIPTION OF THE DRAWINGS

Embodiments of the invention will now be described by way of reference example to the accompanying drawings, in which.

DETAILED DESCRIPTION OF EMBODIMENTS

Figure 3:
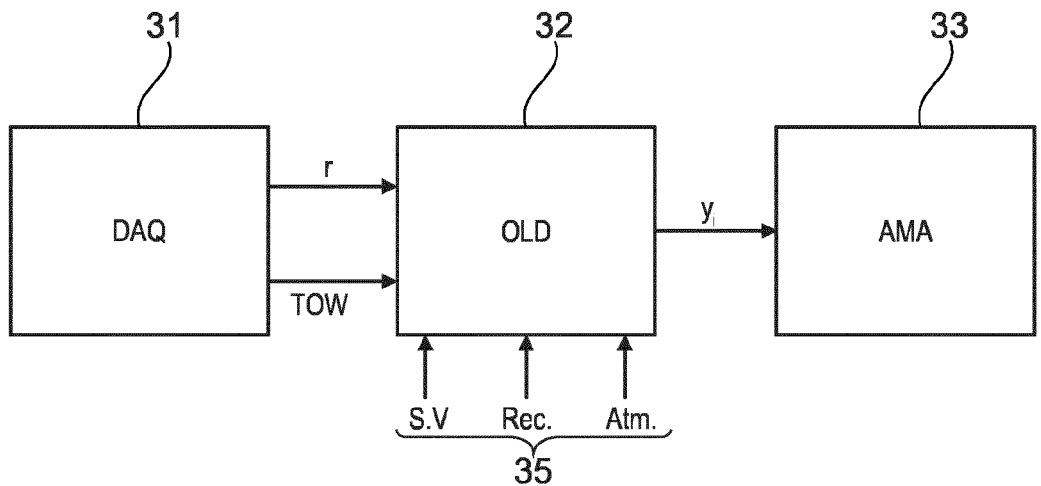
FIG. 3 is a block diagram of the system architecture of the measurement system according to an embodiment of the invention.

FIG. 3 is a block diagram of the system architecture of the measurement system according to an embodiment of the invention;

The system architecture can be organized in three main blocks: the Data Acquisition (DAQ) 31, the Open Loop Demodulator (OLD) 32 and the Atmospheric Monitoring Algorithms (AMA) 33.

To overcome the problems and disadvantages associated with closed-loop feed-forward or feed-back tracking architectures in GNSS receivers, embodiments of the present invention utilize an open-loop architecture. An embodiment of the invention comprises, as depicted in FIG. 3, of the following components: a data-acquisition module (DAQ) 31, an open-loop demodulator (OLD) 32 and an atmospheric monitoring algorithms module (AMA) 33 incorporating a set of atmospheric monitoring algorithms. As will be discussed in more detail below, DAQ module 31 receives raw (e.g. GNSS) signals and outputs IF samples (r), each having an associated time tag (TOW). Demodulator 32 receives r and TOW and, on the basis of these and of auxiliary data (generally designated 35), generates correlator values $Y_i$, which are output to AMA module 33.

Figure 4:
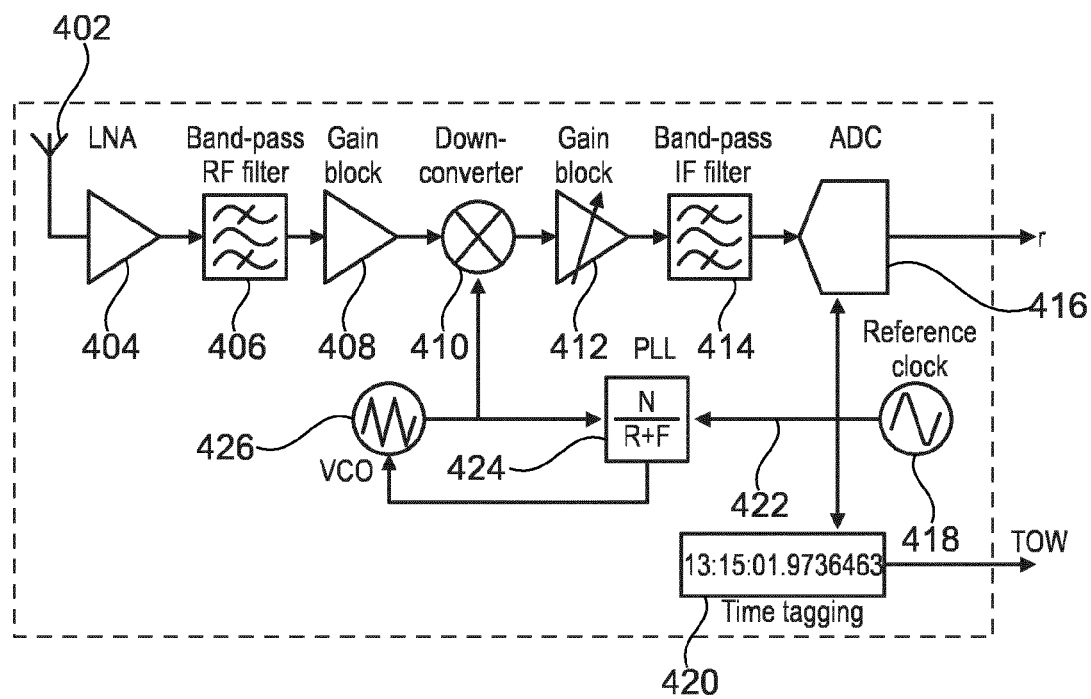
FIG. 4 is a block diagram of the data acquisition module 31 of FIG. 3.

FIG. 4 is a block diagram of the data acquisition module 31 of FIG. 3.

The DAQ module 33, depicted in FIG. 4, performs the tasks of acquiring intermediate frequency samples (r) for one or more GNSS bands from the antenna 402. Signals received at antenna 402 are amplified by low noise amplifier (LNA) 404, passed through bandpass RF filter 406 and a further amplifier 408, to down-converter 410, which converts to IF. The IF signals output from down-converter 410 are subject to further amplification at gain block 412, and passed through a bandpass IF filter 414, before being converted to digital (IF) samples r at ADC 416. A precise clock 418 is used to down-convert and digitize the samples such that a time-tag which is accurately aligned to UTC or a particular GNSS system-time, denoted here by TOW 420, is provided for each IF sample r. The clock signal 422 from reference clock 418 is supplied to PLL 424, which forms a loop with VCO 426, the output of VCO 426 being applied to down-converter 410 for the generation of IF signals. (As will be appreciated by persons skilled in the art, IF data may be either streamed directly to the OLD module 32 (FIG. 3) for real-time processing or streamed to a storage disk for post-processing.) A key feature of the DAQ is the reference clock 418. Preferably, the reference clock 418 is accurately synchronized with UTC or a particular GNSS system-time or its offset is well known. However, in preferred embodiments, it is necessary that the reference clock 418 not be disciplined directly from a GNSS system during a data acquisition, as this would violate the open-loop principle on which embodiments of the system operate. Particular embodiments of the reference clock 418 of the DAQ 31 will be discussed further hereinbelow.

Returning to FIG. 3, the OLD module 32 accepts as inputs the IF samples r and associated time-tags, (TOW and r) from the DAQ 31, and also auxiliary information 35; in the present embodiment, the latter include satellite ephemerides, receiver position information and atmospheric information, respectively denoted S.V., Rec. and Atm. in FIG. 3, although one, some or all of these may be used. Preferably, for each sample of r, the corresponding TOW is used in conjunction with the S.V., Rec. and Atm. information 35 to predict the values of the received signal parameters, denoted $\hat{\tau}_i$ and $\hat{\theta}_i$.

Figure 1:
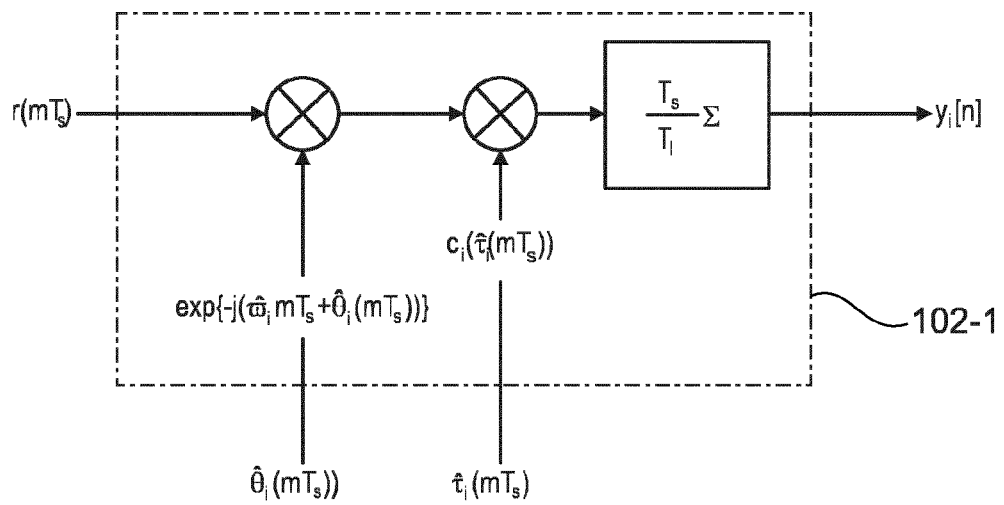
FIG. 1 (PRIOR ART) is a block diagram of the Digital Matched Filter 102-1 of a conventional receiver, illustrating how the local estimates of carrier phase ($\hat{\theta}_i$) and ranging-code delay ($\hat{\tau}_i$) are used to generate the correlator values $Y_i[n]$.

Essentially, this information may be used to predict the propagation channel including the geometric range, relativistic effects, any known and/or deterministic atmospheric effects, satellite clock and hardware biases and any known receiver biases. These signal parameters are then passed to a DMF, which may be a standard DMF 102 as depicted in FIG. 1 to produce correlator values, Y[n]. The DMF 102 performs the carrier and ranging-code wipe-off and subsequent integrate-and-dump operation to produce the correlator values Y[n]. Referring to the phase process described in Eq. (2), the processes $\theta_{LOS}(t)$ and $\theta_{SV\ Clk.}(t)$ are removed, leaving only that which corresponds to the atmosphere and residual errors stemming from errors in the satellite ephemerides. At least one correlator value Y[n] is produced for each signal which is captured within the IF data, for each visible satellite, although extra correlator values, corresponding to particular offsets in either or both the ranging-code delay or carrier phase can be generated.

The AMA module 33 accepts as input the correlator values Y[n] generated by the OLD module 32 and uses them to produce various measurements of the atmosphere. The module may implement a variety of algorithms which provide information about the state of the atmosphere or levels of atmospheric activity. In particular, AMA module 33 may perform generation of measurements which relate to ionospheric activity, including those which describe or quantify scintillation. Although many receivers use both the correlator values Y[n] and a full phase estimate, by exploiting characteristics of the algorithms, AMA module 33 may implement standard ionospheric measurement algorithms with $Y_i$ alone.

Referring to FIG. 4, the DAQ module 31 incorporates the receiver antenna 402 and processes the received RF GNSS signals. The output of this block is a precisely time-tagged stream of digital GNSS data (r, TOW). The latter is essentially a digital representation of the GNSS signal, as it is received by the antenna, where each sample r is paired with a precise time-tag TOW. Time can be expressed in the local time-frame (receiver) or in the remote time-frame (space vehicle, transmitter). In either case, a local counter, representing the current time, may be incremented as each sample r of the IF signal is recorded by the analogue-to-digital converter 416. The value of this counter is paired with this sample r, representing the time-tag TOW.

Preferably, a sufficiently precise clock 418 is used to collect the IF data and generate the time tags (TOW). More preferably, for scintillation monitoring, a clock 418 needs to exhibit very low phase noise. Embodiments of the present invention also impose a second requirement on clock drift and drift-rate characteristics, which needs to be stable enough to fit a known model for the entire duration of the data acquisition operation. The degree of alignment with a given GNSS time-frame that is necessary is determined by the characteristics of the signal being monitored and is in the nominally taken to be less than one tenth of the period of a ranging-code chip. According to embodiments, different implementation may be employed, as set out below.

For example, a live implementation of the invention uses a GNSS front-end and digitizer. Typically such a system is composed of a signal pre-conditioning block (pre-amplifiers and filters), one or more synthesizers and mixers, anti-aliasing filters and an Analog to Digital Converter (ADC). The clock used to tune the local oscillators should also drive the ADC. A post-mission implementation involves streaming data from a file that was previously captured with a GNSS digitizer.

The process of time tagging a GNSS sample stream is driven by a single reference clock 418, as depicted in FIG. 4. It is important that this clock be aligned with a GNSS time frame and that it can be used to propagate an estimate of time, for the generation of time-tags, with very high accuracy ($\approx 1.$–nanosecond).

In one embodiment, a perfect (i.e. perfectly modelled) clock 418 is used. In this case the DAQ module 31 simply propagates the time from a single synchronization point in the past using the predictable sample period.

Another embodiment involves relying on a Disciplined Oscillator (DO). In this case the DAQ module 31 requires that the reference oscillator maintains alignment during the period of time during which data is acquired. Disciplined oscillators generally contain an internal oscillator and exploit an external frequency standard to provide corrections, or steering, to the internal oscillator. One common source of external frequency standard is a GNSS signal. In the case that the disciplining does come from a GNSS (i.e. using a GPS Disciplined Oscillator (GPSDO)), it must be ensured that the disciplining is performed before the data acquisition process begins. Moreover, it must be ensured that the device has sufficiently good hold-over performance to maintain alignment throughout the entire data-collection process. Of course, such an implementation may employ a standard, off-the-shelf, GPSDO as a reference clock, and choose to disable the disciplining action during the data-acquisition period.

In another embodiment, in which a free-running clock is used, live modelling of its unknown parameters (i.e. drift and drift-rate) is performed using a bespoke clock estimation algorithm. In essence, this is equivalent to the embodiment of the preceding paragraph, in the sense that the GNSS system is used as a reference, against which unknown parameters of the reference clock are estimated. However, rather than attempt to steer, or discipline the oscillator, the estimated clock parameters are simply measured, and are used to more accurately propagate the time-tags from an initial synchronization point. A special case of this is the post-processing of previously acquired data. The data is post-processed and one (or more) satellite signals which appear to be unaffected, or only mildly affected, by the atmospheric anomaly under test can be utilized to estimate the unknown clock parameters. Note that the set of satellites used to estimate the unknown clock parameters and those used to monitor the atmosphere must be mutually exclusive. This approach has extensively been used to validate results against scintillation files archived earlier in time without using a precise time tagging feature.

The three abovementioned embodiments of the reference clock 418 represent a means of propagating an initial synchronization point, from an initial time-tag, forward in time. In all cases this initial time-synchronization must be achieved. In embodiments, this is done by processing the output, r, of the DAQ 31. These samples can be processed as is done in a typical GNSS receiver whereby traditional, closed-loop algorithms are applied to the samples r and a position and time fix is computed. This time-fix will provide the initial synchronization point for the time-tagging process.

Figure 5:
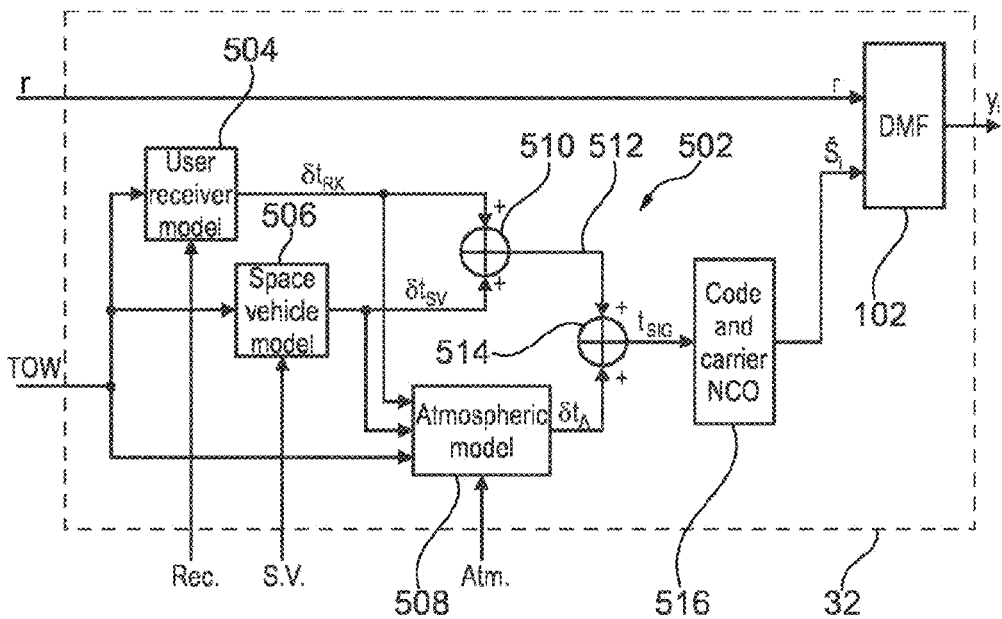
FIG. 5 is a block diagram of the open-loop demodulation module 32 of FIG. 3.

FIG. 5 is a block diagram of the open-loop demodulation module 32 of FIG. 3.

The Open Loop Demodulator (OLD) module 32 processes IF samples r produced by the DAQ module 31 to produce correlator values $Y_i$. The necessary inputs to the OLD module 32 preferably include: a precisely time tagged stream of digital GNSS data (r, TOW); user dynamics, space vehicle dynamics (including on-board clock), and atmospheric delays. Note that the delays induced on the receiver side are modelled by/absorbed into the IF sample time-tags TOW. The module produces as outputs correlator values $Y_i$, for each of the visible satellite signals. A typical coherent integration period is 1 ms, however a more general implementation can use shorter or longer periods.

The OLD 32, as depicted in FIG. 5, is composed of two main sub-blocks: a GNSS signal synthesizer 502 and a DMF 102. The synthesizer reproduces the satellite signals as they would be observed at the receiving antenna 402 (FIG. 4) at the specific user location and time. In order to do so, the trajectory of the user antenna 402 needs to be either zero or precisely known. This is achieved by providing the input, denoted 'Rec.' in FIG. 5, which represents a piecewise continuous trajectory of the receiver antenna 402 in an earth-centered, earth-fixed frame. OLD 32 suitably comprises a user receiver model for receiving a time tag (TOW) and the input Rec; and the user receiver module 504 outputs a time delay $\Delta(t)_{RX}$.

The satellite signal dynamics is generated using orbital parameters and clock corrections combined with the precise time reference. The parameters of this trajectory model are denoted in FIG. 5 by the variable 'S.V.'. These orbital parameters are often referred to as ephemerides and can take the form of a set of broadcast ephemerides, as provided by the GNSS, a set of third-party so-called precise ephemerides, or any other suitable trajectory model. Typical examples are the broadcast sets of Keplerian parameters used for GPS, Galileo and BeiDou, or the Cartesian positions and derivatives model used for GLONASS, other options include the precise ephemeris models provided by third parties such as the International GNSS Service (IGS). OLD 32 suitably also includes a space vehicle model 506; and a space vehicle model 506 is adapted to receive a time tag (TOW) and the orbital parameters (S.V.) and to generate a time delay $\delta t_{SV}$ related to the space vehicle. Finally, the estimates of the atmospheric delays are each produced using another model, suitably parameterized using known values or auxiliary ephemeris information, this information is denoted in FIG. 5 by the variable 'Atm.'. Typical models include the Klobuchar or NeQuick models for the ionosphere and Saastamoinen model for the troposphere, to name just a few. The atmospheric model 508 is adapted to receive the time tag (TOW), the time delay ($\delta t_{RX}$) related to the receiver, the time delay ($\delta t_{SV}$) related to the space vehicle and the ephemeris information (Atm.). From these, the atmospheric model 508 generates an atmosphere related time delay ($\delta t_A$).

OLD 32 includes a first summing element 510 for generating a first sum 512 comprising the sum of the delay ($\delta t_{RX}$) related to the receiver and the delay ($\delta t_{SV}$) related to the space vehicle. In addition, a second summing element 514 is adapted to generate a second sum comprising the sum of the first sum 512 and the time delay ($\delta t_A$) related to the atmosphere, in order to generate a signal related time delay ($t_{SIG}$). The signal related time delay ($t_{SIG}$) is input to a code and carrier MCO 516 in order to generate an estimate ($\hat{S}_i$) for input to a DMF 102.

Figure 2:
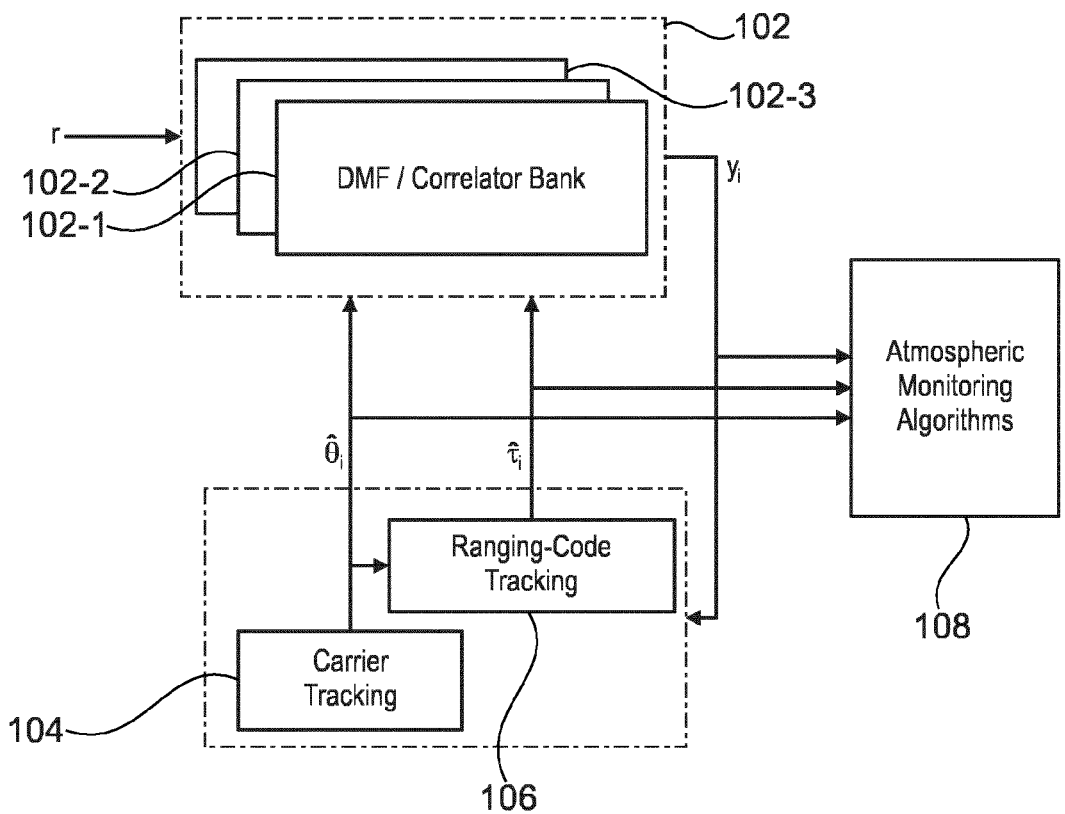
FIG. 2 (PRIOR ART) is a block diagram of a typical closed-loop tracking architecture depicting a loop for both a carrier tracking loop 104 and a ranging-code tracking 106.

The DMF 102 performs the despreading and accumulation of the input signal stream against the simulated replica signal, as depicted in FIG. 1. This step is very similar to what a correlator engine does in a typical closed-loop GNSS receiver, as depicted in FIG. 2, with the distinction that there is no feedback operation. Advantageously, the present invention relies in measuring amplitude, delay and phase variations precisely observable in the received signal without relying on any feed-back mechanism which observes the correlator outputs $Y_i$ which may, themselves, be affected by those anomalies. In one embodiment of the DMF 102, only one correlator per satellite signal is used, but the concept is more general and an arbitrary number could be used. In another embodiment, many correlators are implemented, spaced both in frequency and delay around the nominally aligned correlator, so as to provide more robust and accurate estimation of the received signal parameters. In embodiments, implementation involves classical real-time or post-processing.

Inside OLD 32 the interface between the two sub-blocks (the signal synthesizer 502 and the DMF 102) is a sequence of properly timed code delay and carrier phase, respectively $\hat{\tau}_i$ and $\hat{\theta}_i$. Both are related to the Line Of Sight (LOS) geometric range between the user and the navigation satellite antennas, but there are substantial differences due, amongst other factors, to the atmosphere being a dispersive medium. Using the precise stream time the accumulator can be dumped at any time, but usually in a synchronized fashion with the spreading code edges. Moreover, given access to broadcast navigation messages, a significant portion of the navigation message can be predicted, allowing bit wipe-off to be performed on the received signal. When possible, it significantly enhances phase reconstruction, as discussed in the following section.

The Atmospheric Monitoring Algorithms (AMA) module 33 (FIG. 3) accepts as inputs the complex correlator values, Y [n], from the OLD module 32 and produces as outputs atmospheric measurements. In the following, embodiments of an ionospheric scintillation monitoring module which produces the common scintillation indices, including $S_4$ and $\sigma_\varphi$, as defined below, are discussed.

Figure 6:
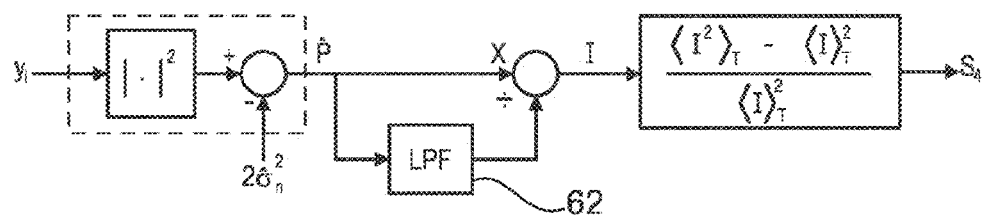
FIG. 6 is a block diagram of the process, carried out in the AMA module 33 of FIG. 3, of calculating the value of $S_4$ given a series of correlator values, $Y_i$.

Widely accepted parameters for scintillation characterization are $S_4$ for amplitude and $\sigma_\varphi$ for carrier phase. Generally, calculation of $S_4$ requires the calculation of an intermediate parameter, denoted $\mathcal{I}$, from the correlator values, Y [n]. In many cases this is often implemented via further intermediate variables, denoted Narrow Band Power (NBP) and Wide Band Power (WBP). Alternatively, other implementations calculate this directly from the correlator values, as is depicted in FIG. 6. The $\mathcal{I}$ values are generally de-trended using a $6^{th}$ order Butterworth low-pass filter with 0.1 Hz bandwidth which, for numerical stability reasons, is implemented as a cascaded series of $2^{nd}$ order filters and is denoted by LPF 62 in FIG. 6.

Figure 7:
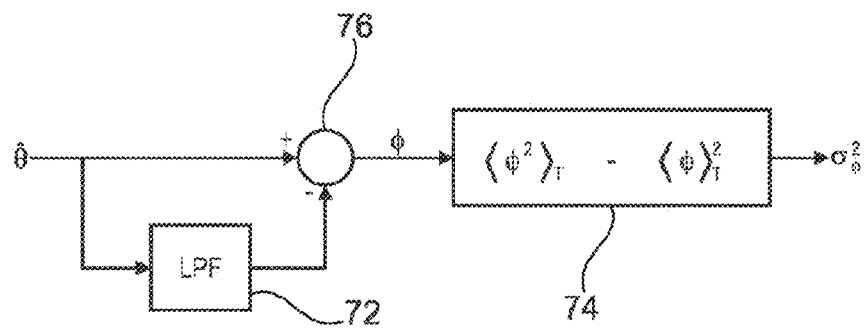
FIG. 7 is a block diagram of the process, carried out in the AMA module 33 of FIG. 3, of calculating the value of $\sigma_\varphi$, given a series of phase estimates, $\hat{\theta}_i$.

FIG. 7 shows a block diagram of the process, carried out in the AMA module 33 of FIG. 3, of calculating the value of $\sigma_\varphi$, given a series of phase estimates, $\hat{\theta}_i$.

The conventional method of calculating the $\sigma_\varphi$ involves three steps, as follows. Firstly the phase of the received GNSS signal is reconstructed and sampled at a fixed sample rate, to produce the equivalent process $\theta$ [n]=$\theta$ ($nT_f$). Secondly, it is de-trended using a $6^{th}$ order Butterworth high-pass filter with 0.1 Hz bandwidth. Finally, the variance of the de-trended phase process is calculated (block 74) over finite non-overlapping blocks of period $\hat{\tau}$ seconds. Thus, complex correlator outputs of the prompt replica (or rather their by-products) are used to evaluate amplitude anomalies whereas carrier phase measurements are used to measure phase anomalies. As depicted in FIG. 7, the high-pass filter is implemented as the difference (via summing element 76) between the signal and low-pass component, generated via filtering by the LPF 72.

It is noted that a standard GNSS receiver derives carrier phase observations via a closed loop phase-tracking algorithm, such as a PLL. In contrast, in the embodiment of the present invention, two novel approaches to calculate $\sigma_\varphi$ are employed. The advantages of not tracking the received signal phase with a closed loop include: isolating the scintillation index calculation from tracking loop filter artefacts, and circumventing problems of phase tracking failures (e.g. cycle slips) under very poor signal conditions.

Both embodiments of methods for calculating $\sigma_\varphi$ exploit the fact that the reconstructed phase is immediately detrended. As noted hereinabove, the OLD module 32, via the signal synthesis, removes all of the known deterministic contributions to the carrier phase, including the line of sight (LOS) dynamic, the satellite clock and known atmospheric contributions. What remains are the residual errors stemming from ephemerides and atmospheric models and a further phase contribution from the local oscillator. The de-trending process removes the contribution of all factors other than $\theta_{Atm.}$ (t) and, therefore, the phase reconstruction process need only represent this term. The two embodiments are as follows:

Method 1: Re-Construction of the Phase Process.

Figure 8:
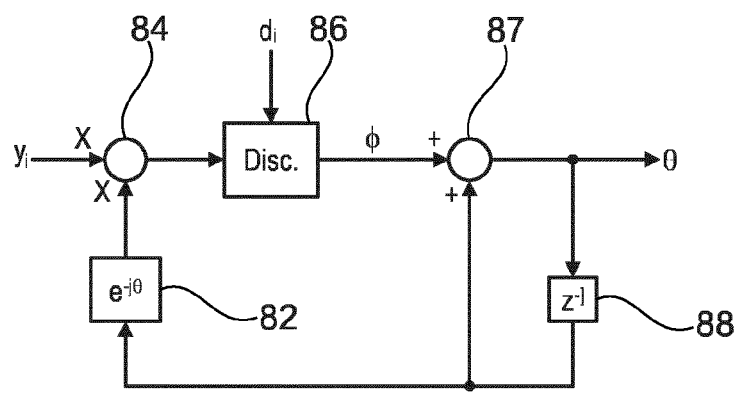
FIG. 8 is a block diagram of the process, carried out in the AMA module 33 of FIG. 3, of phase reconstruction from the correlator values, $Y_i$, which calculates the current phase.

FIG. 8 shows a block diagram of the process, carried out in the AMA module 33 of FIG. 3, of phase reconstruction from the correlator values, $Y_i$, which calculates the current phase as the sum of the previous phase and the phase residual observed on when de-rotating the current correlator by the previous phase estimate. The notation $e^{-j\theta}$ represents a unit vector on the complex plane bearing an angle of $-\theta$ relative to the real axis and the notation $z^{-1}$ represents a single sample delay. In this case, the useful part of the phase process is re-constructed by cumulative sum of the phase differences calculated between successive pairs of correlator values (i.e. Y [n−1] and Y [n]). As shown in FIG. 8, the correlator values $Y_i$ are de-rotated (via block 82 input to first multiplication element 84) by the previous phase estimate and the residual phase error is measured. A discriminator block 84 represents the phase discriminator function, described in Eq. 4. The total phase estimate, 0, is provided by cumulating these residual phase measurements. The resultant phase process can be processed in a similar manner to that produced by a typical GNSS receiver. The most significant contribution to the carrier frequency phase measurement is due to LOS velocity between user and satellite antenna as well as the difference between user and satellite clock drift. Generally, when using phase measurements from a traditional receiver, this contribution is filtered out by the de-trending filter at the expense of non-negligible convergence time. Indeed, this convergence time of such a filter can be in the order of minutes. This technique naturally removes this phase contribution. Results show that, in nominal noise conditions, the same de-trending filter produces exactly the same results on the conventional phase process and the one of Method 1, but converges much quicker in the latter case.

Specifically, the phase process is reconstructed as follows. Firstly, the current correlator values are de-rotated by the previous phase estimate (which is initialized at zero for the first sample). Secondly, the residual phase $\varphi$ is estimated by either a coherent (four-quadrant arctangent) or non-coherent (arctangent) discriminator 86, depending on whether the sign of the data-bit corresponding to the current sample is known. The value of the current phase $\varphi$ is then computed as sum (via summing element 87) of the previous phase (derived by application of block 88) and the current residual phase $\varphi$. Mathematically, this process can be represented by:

$$Y'[n] = Y[n]e^{-i\theta[n-1]} \quad (4)$$

$$\Delta[n] = \begin{cases} \text{atan2}(d[n]\mathfrak{R}\{Y'[n]\}, \mathfrak{I}\{Y'[n]\}) & \text{if data known} \\ \text{atan}\left(\dfrac{\mathfrak{I}\{Y'[n]\}}{\mathfrak{R}\{Y'[n]\}}\right) & \text{otherwise} \end{cases}$$

$$\theta[n] = \theta[n-1] + \Delta[n]$$

where d [n] is the value of the current data bit and we assume that the phase process can be decomposed into a recursive summation of phase differences, as: $\theta[n]=\theta[n-1]+\Delta[n]$, the notation $\mathfrak{R}\{x\}$ and $\mathfrak{I}\{x\}$ respectively denoting the real and imaginary parts of x, and the functions a tan (x) and a tan 2(y, x), respectively denoting the arctangent and four-quadrant arctangent functions. The processing of this phase estimate to produce the $\sigma_\varphi$ measurement then follows the standard algorithm depicted in FIG. 7.

Method 2: Modified De-Trending Filter.

Figure 9:
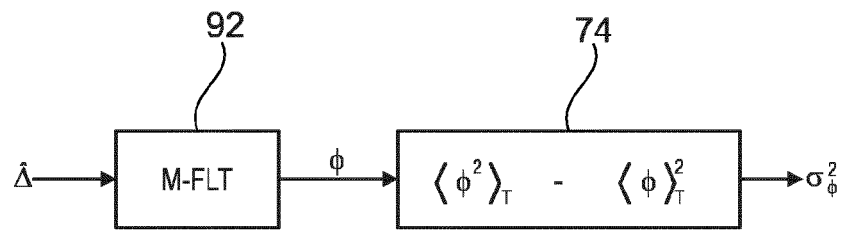
FIG. 9 is a block diagram of the process, carried out in the AMA module 33 of FIG. 3, of calculating the value of $\sigma_\varphi$ given a series of phase-difference estimates, $\hat{\Delta}$.

FIG. 9 is a block diagram of the process, carried out in the AMA module 33 of FIG. 3, of calculating the value of $\sigma_\varphi$ given a series of phase-difference estimates, $\hat{\Delta}$. The second approach leverages the fact that a $6^{th}$ order high-pass filter with 0.1 Hz bandwidth essentially removes all slowly varying dynamics of the carrier phase. This suggests that phase process reconstruction can be avoided altogether and phase differences used instead of absolute phase. The de-trending filter order can be reduced by one and an equivalent but simpler filter generates exactly the same results obtained following the conventional approach. This new filter is found as follows. Assume a traditional $6^{th}$ order high-pass Butterworth filter having z-domain transfer function given by:

$$H(z) = \frac{B(z)}{A(z)} = \frac{\sum_{i=0}^{6} b_i z^{-i}}{1 + \sum_{i=1}^{6} a_i z^{-1}} \quad (5)$$

where the output of Eq. (5) is the de-trended phase process, denoted here by $\theta^D$ [n], is found by applying H (z) to the reconstructed phase, $\theta$ [n]. This filter identically equivalent to the cascaded process of applying a filter B (z) to $\theta$ (t) and subsequently applying the filter 1/A (z) to the result. Therefore, the phase process, $\theta$ [n], is only operated upon by B (z).

At epoch n, the output of the filter B (z) applied to $\theta$ [n], denoted here by $\theta_B$ [n] is given by:

$$\theta_B[n] = \sum_{i=0}^{6} b_i \theta[n-i] \quad (6)$$

Again, assuming a decomposition of the phase process into a summation of phase-differences, then Eq. (6) is be given by:

$$\theta_B[n] = \sum_{i=0}^{6} b_i \left( \sum_{j=i}^{6} \Delta[n-j] + \theta[n-7] \right) \quad (7)$$

$$= \sum_{i=0}^{6} \sum_{j=i}^{6} b_i \Delta[n-j] + \sum_{i=0}^{6} b_i \theta[n-7]$$

Noting that as H (z) is a high-pass filter and has a zero DC gain, then H (1)=0 and so $$\sum_{i=0}^{6} b_i = 0 \quad (8)$$

and (7) reduces to:

$$\theta_B[n] = \sum_{i=0}^{6}\sum_{j=i}^{6} b_i \Delta[n-j] \quad (9)$$

$$= \sum_{i=0}^{6}\sum_{j=i}^{j} b_i \Delta[n-j]$$

$$= \sum_{j=0}^{6} \Delta[n-j] \sum_{i=0}^{j} b_i$$

$$= \sum_{j=0}^{6} \Delta[n-j] c_j$$

where $$c_j = \sum_{i=0}^{j} b_i \quad (10)$$

recalling (8), we find that $c_6 = 0$ and so $$\theta_B[n] = \sum_{j=0}^{5} \Delta[n-j] c_j. \quad (11)$$

Therefore it is shown that the de-trended phase process, $\theta^D$, obtained by processing the original phase process $\theta$ using the filter $H(z)$, is identically equivalent to that obtained by processing the phase-difference process $\Delta[n] = \theta[n] - \theta[n-1]$, using a new filter given by:

$$H(z) = \frac{C(z)}{A(z)} = \frac{\sum_{i=0}^{5} c_i z^{-i}}{1 + \sum_{i=1}^{6} a_i z^{-i}}. \quad (12)$$

The implication of (12) is that no phase process need be reconstructed and that only estimation of the phase difference across two adjacent correlator values is necessary. This greatly simplifies the generation of $\sigma_\varphi$, and results in a significantly more robust monitoring algorithm. Specifically, in one embodiment, a reconstruction of the phase difference process involves:

$$\Delta[n] = \begin{cases} \operatorname{atan2}(\text{Cross}, \text{Dot}) & \text{if data known} \\ \operatorname{atan}\left(\frac{\text{Cross}}{\text{Dot}}\right) & \text{otherwise} \end{cases} \quad (13)$$

$$\text{Dot} = \Re\{Y[n]\}\Re\{Y[n-1]\} + \Im\{Y[n]\}\Im\{Y[n-1]\}$$

$$\text{Cross} = \Im\{Y[n]\}\Re\{Y[n-1]\} - \Re\{Y[n]\}\Im\{Y[n-1]\}$$

where either of the two phase-difference estimators is used, depending on whether or not the data-bit of both correlator values are known. Having generated this phase difference process, the modified filter can be applied and, finally, an estimate of $\sigma_\varphi$ can be computed. The process of $\sigma_\varphi$ computation from $\Delta[n]$ values is depicted in FIG. 9 wherein the block labelled 'M-FLT' represents the modified filter described here.

Although the simple direct estimation of the phase difference, as given by Eq. (13), is assumed in the following, in alternative embodiments further processing of the correlator values may be done to enhance the estimate of $\Delta[n]$. For example, the estimate may be conditioned upon a priori statistical models for the phase process; a scheme may be implemented to reject or correct estimates that appear to be outliers, or blunders; multiple successive correlator values, three or more, may also be observed.

Figure 10:
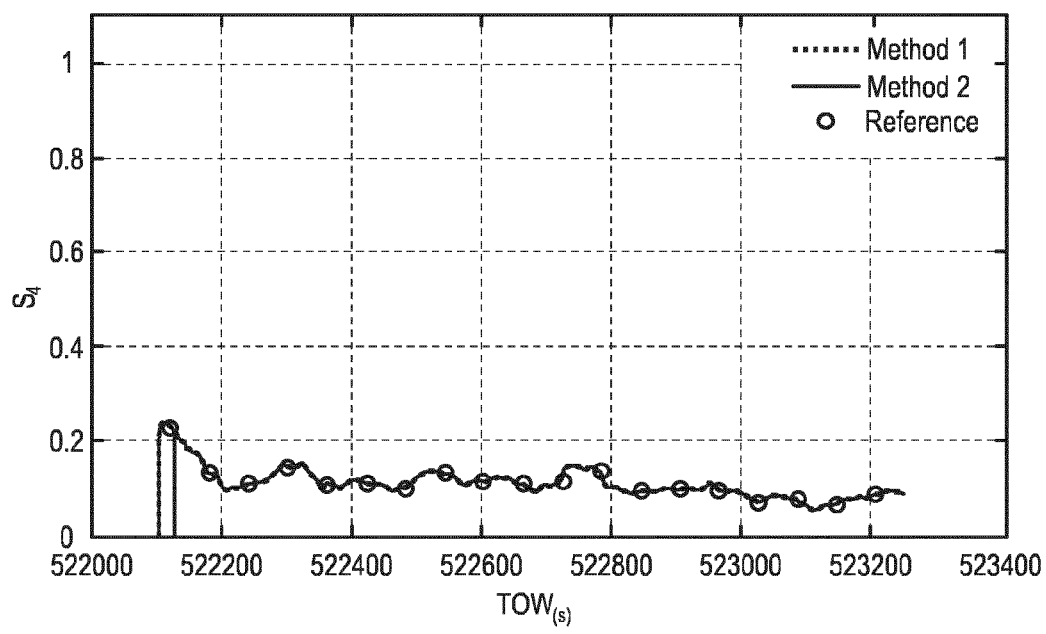
FIG. 10 is a plot of $S_4$ versus time as calculated by both Method 1 and Method 2, using the algorithm depicted in FIG. 6, and compared to a reference value provided by a commercial atmospheric monitoring receiver.
Figure 11:
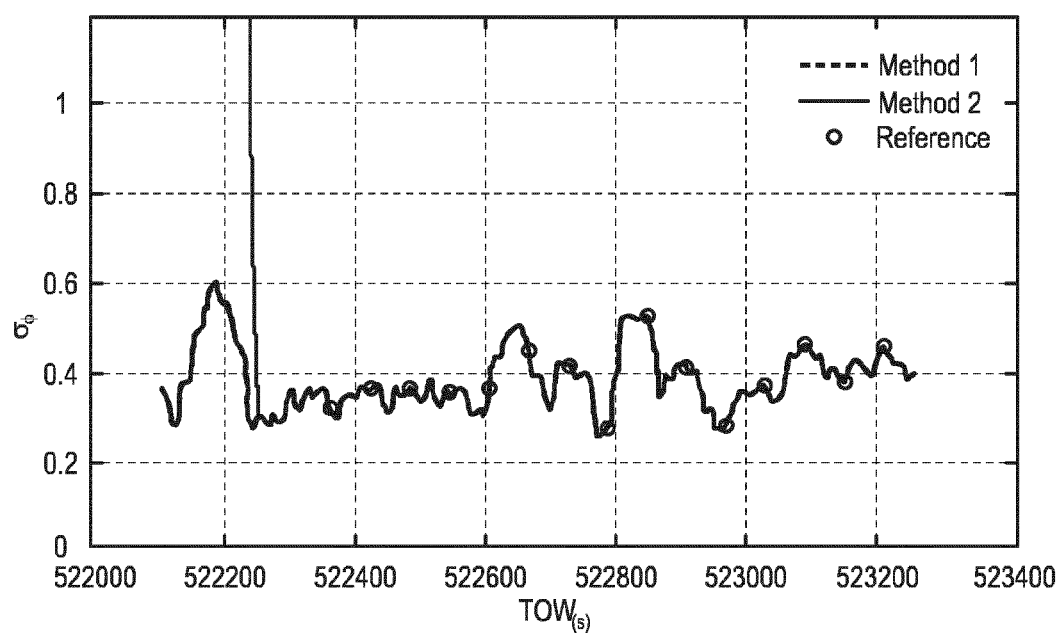
FIG. 11 is a plot of $\sigma_\varphi$ versus time as calculated by both Method 1 and Method 2, carried out in the AMA module 33 of FIG. 3, using the algorithms depicted in FIG. 7 and FIG. 9, and compared to a reference value provided by a commercial atmospheric monitoring receiver.

A comparison of $\sigma_\varphi$, and $S_4$ as calculated by Method 1 and Method 2 and a commercial atmospheric monitoring (Reference) receiver are presented in FIG. 10 and FIG. 11, respectively, wherein it can be seen that the open-loop monitoring algorithm is capable of perfectly reproducing that of a traditional closed-loop receiver.

While embodiments have been described by reference to embodiments having various components in their respective implementations, it will be appreciated that other embodiments make use of other combinations and permutations of these and other components.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit and scope of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A measurement system for generating ionospheric phase scintillation measurements based on at least one Global Navigation Satellite System (GNSS) signal from a satellite-borne transmitter of a GNSS, the measurement system comprising, in a ground-based receiver:

a data acquisition module, a demodulator module and an atmospheric monitoring algorithms module arranged in an open loop configuration;

wherein the data acquisition module is adapted to receive said GNSS signal and includes a reference clock and an analog-to-digital converter (ADC) coupled to the reference clock, the ADC being adapted to generate a plurality of intermediate frequency (IF) samples (r)

under the timing of the reference clock, each IF sample having an associated time tag (TOW) derived from said reference clock;

wherein the demodulator module is adapted to receive said IF samples (r) and associated time tags (TOW) and auxiliary data related to said satellite system, the auxiliary data includes ephemeris information (ATM), and is adapted to generate correlator values ($Y_i$) therefrom; and wherein the atmospheric monitoring algorithms module is adapted to receive said correlator values ($Y_i$) and to generate therefrom said phase scintillation measurements ($\sigma_\varphi$); and wherein the atmospheric monitoring algorithms module includes a phase process reconstruction algorithm, the phase process reconstruction algorithm comprising:
de-rotating the current correlator values ($Y_i$) by a previous phase estimate;
estimating a residual phase ($\phi$) using a discriminator; and
computing a current phase ($\theta$) as a sum of the previous phase and the current residual phase ($\phi$).

2. The system of claim 1, wherein the data acquisition module is adapted to output each IF sample (r) as a tagged IF sample (r), each tagged IF sample (r) comprising an IF sample (r) tagged with a respective time tag (TOW).

3. The system of claim 1, wherein the demodulator module is adapted to receive said tagged IF samples (r), whereby each correlator value ($Y_i$) generated by the demodulator module is associated with a respective time tag (TOW).

4. The system of claim 1, wherein the data acquisition module comprises a time tagging module adapted to output said time tags (TOW) synchronously with a respective IF samples (r).

5. The system of claim 1, wherein the data acquisition module comprises a time tagging module coupled to the reference clock, time tagging module being adapted to operate as a local counter representing local time, the count of the local counter being incremented as each IF sample (r) is generated.

6. The system of claim 1, wherein the data acquisition module comprises a down-converter adapted to generate analog IF signals from the radionavigation signals, the down-converter operating based on a conversion signal derived from the output of the reference clock.

7. The system of claim 6, wherein the data acquisition module comprises a PLL coupled to receive the output of the reference clock, wherein the PLL drives a VCO that provides the conversion signal to the down-converter.

8. The system of claim 1, wherein the reference clock has a degree of alignment with a time-frame of the radionavigation signal of less than one tenth of the period of a ranging-code chip of the radionavigation signal.

9. The system of claim 1, wherein the reference clock has a degree of alignment with a time-frame of the radionavigation signal such that it can be used to propagate an estimate of time, for the generation of time-tags, with an accuracy of about 1 nanosecond.

10. The system of claim 1, wherein the reference clock is adapted to propagate from an initial synchronization point, corresponding to an initial time-tag, forward in time.

11. The system of claim 1, wherein the reference clock comprises a perfectly modelled clock, wherein said time tags are derived from time signals propagated from a signal synchronization point in the past using a predetermined sample period.

12. The system of claim 1, wherein the reference clock comprises a disciplined oscillator, the disciplined oscillator including an internal oscillator and being adapted to receive a disciplining clock signal from an external frequency standard.

13. The system of claim 12, operable in an initiation phase and a data acquisition phase, wherein the reference clock is operable such that disciplining by the disciplined oscillator is active during the initiation phase and disabled during the data acquisition phase.

14. The system of claim 13, wherein the external frequency standard is provided by one of a GNSS signal and a GPS Disciplined Oscillator (GPSDO) signal.

15. The system of claim 1, wherein the reference clock comprises a free running clock upon which live modelling of its unknown parameters are performed using a clock estimation algorithm.

16. The system of claim 15, wherein the reference clock is operable to
measure estimated clock parameters, and
accurately propagate the time-tags from an initial synchronization point based on the estimated clock parameters.

17. The system of claim 16, wherein the estimated clock parameters are measured from radionavigation signals from a first set of satellite-borne transmitters and wherein the radionavigation signal(s) received by said data acquisition module are from one or more satellite-borne transmitters of a second set of satellite-borne transmitters, the first set and the second set not having a satellite-borne transmitter in common.

18. The system of claim 1, wherein the auxiliary data includes a receiver related parameter (Rec.), the receiver related parameter representing a piecewise continuous trajectory of the receiver antenna in an earth centred, earth fixed frame.

19. The system of claim 1, wherein the auxiliary data includes orbital parameters (S.V.) of a satellite upon which the transmitter is mounted.

20. The system of claim 19, wherein the orbital parameters (S.V.) comprise broadcast ephemerides.

21. The system of claim 20, wherein the broadcast ephemerides comprise GNSS ephemerides or precise ephemerides.

22. The system of claim 1, wherein the demodulator module includes a user receiver model for receiving a time tag (TOW) and the receiver related parameter (Rec.), and for outputting a receiver related time delay ($\delta t_{RX}$).

23. The system of claim 22, wherein the demodulator module includes a space vehicle model, the space vehicle model being adapted to receive a time tag (TOW) and the orbital parameters (S.V.), and to generate a space vehicle related time delay ($\delta t_{SV}$).

24. The system of claim 23, wherein the demodulator module includes an atmospheric model, the atmospheric model being adapted to receive the time tag (TOW), the receiver related time delay ($\delta t_{RX}$), the space vehicle related time delay ($\delta t_{SV}$) and the ephemeris information (Atm.), and to output an atmosphere related time differential ($\delta t_A$).

25. The system of claim 23, wherein the demodulator module is adapted to generate a first sum comprising the sum of the receiver related time differential ($\delta t_{RX}$) and the space vehicle related time differential ($\delta t_{SV}$), and to generate a second sum comprising the sum of the first sum and the atmosphere related time differential ($\delta t_A$) in order to generate a signal related time delay ($t_{SIG}$).

26. The system of claim 25, wherein the demodulator module further includes a code and carrier MCO, adapted to receive the signal delay ($t_{SIG}$) and to generate an estimate ($\hat{s}_i$) for input to a DMF.

27. A measurement method for generating ionospheric phase scintillation measurements based on at least one Global Navigation Satellite System (GNSS) signal from a satellite-borne transmitter of a GNSS, the method comprising:
- providing a data acquisition module, a demodulator module and an atmospheric monitoring algorithms module arranged in an open loop configuration in a ground-based receiver, wherein the data acquisition module includes a reference clock and an analog-to-digital converter (ADC) coupled to the reference clock;
- receiving, using the data acquisition module, said GNSS signal, the ADC being adapted for generating therefrom a plurality of intermediate frequency (IF) samples (r) under the timing of the reference clock, each IF sample having an associated time tag (TOW) derived from said reference clock;
- receiving, using the demodulator module, said IF samples (r) and associated time tags (TOW) and auxiliary data related to said satellite system, the auxiliary data includes ephemeris information (ATM), and generating correlator values (Y) therefrom; and
- receiving, using the atmospheric monitoring algorithms module, said correlator values ($Y_i$) and generating therefrom said phase scintillation measurements ($\sigma_o$); and
- wherein the atmospheric monitoring algorithms module includes a phase process reconstruction algorithm, the phase process reconstruction algorithm being adapted for:
  - de-rotating the current correlator values ($Y_i$) by a previous phase estimate;
  - estimating a residual phase ($\phi$) using a discriminator; and
  - computing a current phase ($\theta$) as a sum of the previous phase and the current residual phase ($\Phi$).

28. A recordable, rewritable or storable medium having recorded or stored thereon data defining or transformable into instructions for execution by processing circuitry and corresponding to at least the steps of claim 27.

29. A server computer incorporating a communications device and a memory device and being adapted for transmission on demand or otherwise of data defining or transformable into instructions for execution by processing circuitry and corresponding to at least the steps of claim 27.

* * * * *